(12) United States Patent   (10) Patent No.: US 7,463,397 B2
Arnone et al.   (45) Date of Patent: Dec. 9, 2008

(54) ELECTRO-OPTIC MODULATOR

(75) Inventors: David F. Arnone, Mountain View, CA (US); Xin Luo, Sunnyvale, CA (US)

(73) Assignee: Bookham Technology plc, Northamptonshire (GB)

( * ) Notice: Subject to any disclaimer, the term of this patent is extended or adjusted under 35 U.S.C. 154(b) by 13 days.

(21) Appl. No.: 11/636,143

(22) Filed: Dec. 7, 2006

(65) Prior Publication Data

US 2007/0139755 A1   Jun. 21, 2007

Related U.S. Application Data

(60) Provisional application No. 60/752,331, filed on Dec. 20, 2005.

(51) Int. Cl.
    *G02F 1/03* (2006.01)
(52) U.S. Cl. ...................................... 359/245; 359/238
(58) Field of Classification Search ................ 359/245, 359/290, 291; 353/101, 119
    See application file for complete search history.

(56) References Cited

U.S. PATENT DOCUMENTS

| 5,189,547 | A |  | 2/1993 | Day et al. |  |
|---|---|---|---|---|---|
| 5,414,552 | A |  | 5/1995 | Godil |  |
| 5,787,126 | A |  | 7/1998 | Itoh et al. |  |
| 5,999,343 | A |  | 12/1999 | Diedrich et al. |  |
| 6,160,374 | A |  | 12/2000 | Hayes et al. |  |
| 6,693,573 | B1 |  | 2/2004 | Linder |  |
| 7,116,463 | B2 | * | 10/2006 | Wu et al. | ..................... 359/291 |
| 2005/0162760 | A1 | * | 7/2005 | Fujimori et al. | ............. 359/820 |
| 2006/0007966 | A1 |  | 1/2006 | Laughman et al. |  |
| 2006/0039169 | A1 |  | 2/2006 | Chen et al. |  |
| 2006/0092494 | A1 |  | 5/2006 | Tinoco |  |

FOREIGN PATENT DOCUMENTS

| EP | 0 075 435 A2 | 3/1983 |
|---|---|---|
| JP | 59 061817 | 4/1984 |
| JP | 2003/43431 A | 7/2001 |

OTHER PUBLICATIONS

Search Report and Written Opinion for PCT/US2006/047143 (related to the present application), May 23, 2007.

(Continued)

*Primary Examiner*—Timothy J Thompson
(74) *Attorney, Agent, or Firm*—Roeder & Broder LLP

(57) ABSTRACT

A beam modulator (14) for modulating a beam (20) includes a modulator element (26) and a housing assembly (24). The modulator element (26) is positioned in the path of the beam (20). The housing assembly (24) retains the modulator element (26). The housing assembly (24) can include a housing (234), a first retainer assembly (342), and a second retainer assembly (344). The first retainer assembly (342) flexibly secures the modulator element (26) to the housing (24) and the second retainer assembly (344) fixedly secures the modulator element (26) to the housing (234) with the modulator element (26) positioned between the retainer assemblies (342) (344). With this design, the retainer assemblies (342) (344) can cooperate to retain the modulator element (26) in a fashion that applies a substantially uniform and small pressure across the modulator element (26).

21 Claims, 2 Drawing Sheets

OTHER PUBLICATIONS

Day, Timothy. *Resonant modulators operate over wide frequency ranges*. Technology Guide: Modulators. Laser Focus World. May 1992, pp. 183-188.

*Practical Uses and Applications of Electro-Optic Modulators*. Application Note 2. New Focus Inc. Copyright 2001.

International Preliminary Report on Patentability and Written Opinion for PCT/US06/047143 (related to the present application), publication date Jun. 24, 2008, Bookham Technology plc.

* cited by examiner

US 7,463,397 B2

ELECTRO-OPTIC MODULATOR

RELATED APPLICATION

This application claims priority on U.S. Provisional Application Ser. No. 60/752,331, filed on Dec. 20, 2005, and entitled "Electro-Optic Modulator". The contents of U.S. Provisional Application Ser. No. 60/752,331 are incorporated herein by reference.

BACKGROUND

Optical modulators are used to electrically modulate a laser beam from a laser source for optical communication, scientific instruments and other instruments. One type of optical modulator includes a crystal (EO material) and a drive circuit that applies a driving voltage across the crystal. In this design, the laser beam is directed at the crystal. The voltage across the crystal changes the index of refraction of the crystal. The amount in which the index of refraction is changed is proportional to the amount of voltage applied to it. With this design, the crystal changes the path length of the laser beam through the crystal in accordance with the frequency of the driving voltage. Thus, a laser beam emerging from the crystal is modulated by the frequency of the driving voltage.

Designers are always trying to increase the efficiency of the modulator, i.e. reduce the driving voltage or power requirement of the optical modulator. Efficiency of the optical modulator is fundamentally determined by the EO materials used in optical modulator. However, one way to increase effective efficiency is to exploit the dielectric nature of EO material. For example, the EO material and the conductive electrode connected to the EO material forms a capacitor. By connecting the capacitor with other circuit elements such as inductors, or by placing the EO material in a resonant cavity, one can increase the charge or electrical field across capacitor by accumulator charges through resonant effect. The figure of merit of resonant circuits is its Q. The efficiency of resonant optical modulators is proportional to the square root of cavity Q. High Q cavity design requires a conductive cavity (metals, such as Al, Au, etc) in close contact with the dielectric EO material.

SUMMARY

The present invention is directed to a beam modulator for modulating a beam having a beam path. The beam modulator includes a modulator element and a housing assembly. The modulator element is positioned in the beam path. The housing assembly retains the modulator element. In one embodiment, the housing assembly including a housing, and a first retainer assembly that flexibly secures the modulator element to the housing. Additionally, the housing assembly can include a second retainer assembly that fixedly secures the modulator element with the modulator element positioned between the retainer assemblies.

In certain embodiments, the retainer assemblies cooperate to retain the modulator element in a fashion that applies a substantially uniform, controlled, and small pressure across the modulator element. This improves the efficiency of the beam modulator. Further, the design provided herein is relatively easy to manufacture and assemble.

In one embodiment, the first retainer assembly includes a first mount that is secured the modulator element and a flexible attacher that flexible attaches the first mount to the housing.

Additionally, the beam modulator can include a modulator circuit that is electrically connected to the modulator element. In this embodiment, the modulator circuit directs a voltage across the modulator element to change an index of refraction of the modulator element.

Moreover, the present invention is directed to a precision apparatus that includes a beam source that generates a beam and the beam modulator positioned in the path of the beam. Further, the present invention is directed to a method for modulating a beam

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
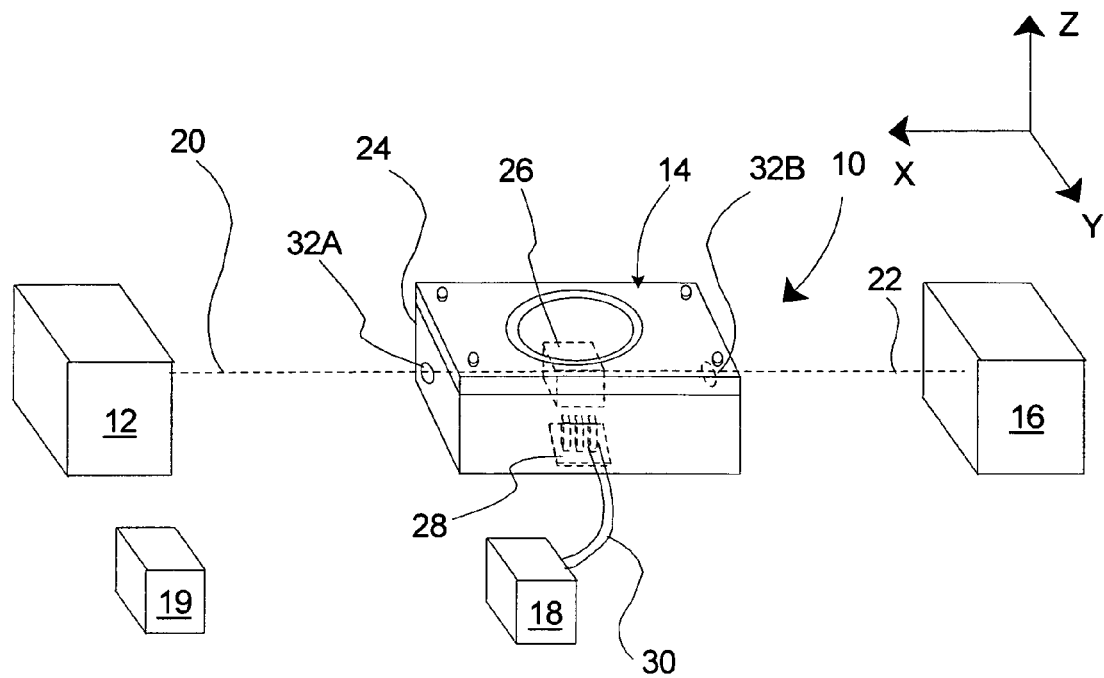
FIG. 1 is a simplified perspective view of a precision apparatus having features of the present invention.

Referring to FIG. 1, the present invention is directed to a precision apparatus 10 that, for example, can be used as or in manufacturing, optical communications, technical or scientific instruments. The design and orientation of the components of the precision apparatus 10 can be changed to suit the requirements of the precision apparatus 10. FIG. 1 is a simplified perspective view of one embodiment of the precision apparatus 10. In this embodiment, the precision apparatus 10 includes a beam source 12, a beam modulator 14, an object 16, a voltage source 18 and a control system 19. However, one or more of these components can be optional.

The beam source 12 generates a beam 20 of light energy that is directed at the beam modulator 14. In one embodiment, the beam source 12 is a laser source and the beam 20 is a small diameter optical beam.

The beam modulator 14 is positioned in the path of the beam 20 and modulates the beam 20. In one embodiment, the beam 20 enters the beam modulator 14 and emerges from the beam modulator 14 as a modulated beam 22 that is directed to the object 16. As non-exclusive examples, the object 16 can be a mirror, lens, telescope, filter, emitter and/or detector.

FIG. 1 illustrates one embodiment of the beam modulator 14. In this embodiment, the beam modulator 14 includes a housing assembly 24, a modulator element 26 (illustrated in phantom) that is positioned within the housing assembly 24, and a modulator circuit 28 (illustrated in phantom) that is positioned within the housing assembly 24. The design of each of these components can be modified to suit the design requirements of the beam modulator 14. In FIG. 1, the housing assembly 24 encircles and encloses the modulator element 26 and the modulator circuit 28. With this design, the beam modulator 14 is a single housing, relatively compact electro-optical modulator. Alternatively, for example, the modulator circuit 28 can be positioned outside the housing assembly 24.

As an overview, in certain embodiments, the housing assembly 24 retains the modulator element 26 in a fashion that applies a substantially uniform, controlled pressure across the modulator element 26. This improves the efficiency of the beam modulator 14.

In FIG. 1, the housing assembly 24 includes a housing aperture in one wall that allows a connector line 30 to electrically connect the voltage source 18 to the modulator circuit 28. In one embodiment, this is the only electrical connection that is required to drive the modulator circuit 28.

Additionally, in FIG. 1, the housing assembly 24 includes small optical windows 32A, 32B (one is illustrated in phantom) on opposite sides thereof through which the beam 20, 22 passes and the modulator element 26 is positioned between the windows 32A, 32B. With this design, the beam 20 is directed into the optical window 32A and the modulated beam 22 passes through the optical window 32B. Each window 32A, 32B is made of a material that allows the beam 20, 22 to pass there through. In one embodiment, each window 32A, 32B is made of a substantially transparent material. Alternatively, for example, each window 32A, 32B can be an opening in the housing assembly 24.

The voltage source 18 directs a voltage to the modulator circuit 28. In one embodiment, the voltage source 18 includes a signal generator that provides a low voltage signal to the modulator circuit 28. In one, non-exclusive embodiment, the voltage source 18 provides a sine or square wave having a peak-to-peak voltage of between approximately 0 and 30 volts with a frequency of between approximately 1 MHz and 10 GHz to the modulator circuit 28. It should be noted that the frequencies are not really limited to any design, rather than materials and availability of parts. Accordingly, the voltage source 18 can provide a voltage and/or frequency of greater or lesser than these amounts.

The control system 19 controls the operation of one or more components of the precision apparatus 10. The control system 19 can include one or more processors. In FIG. 1, the control system 19 is positioned away from the other components of the apparatus 10. Alternatively, the control system 19 can be incorporated partly or fully into one of the components of the apparatus 10.

Figure 2:
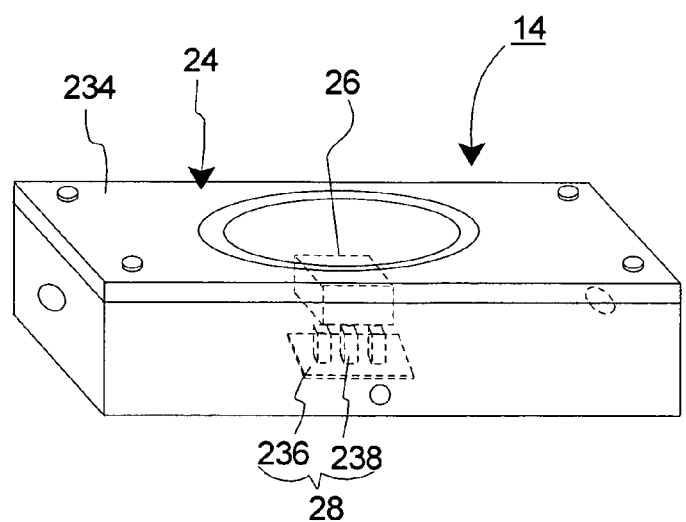
FIG. 2 is a simplified perspective view of a portion of the precision apparatus of FIG. 1.

FIG. 2 is an enlarged perspective view of the beam modulator 14 including the housing assembly 24, the modulator element 26 (illustrated in phantom) and the modulator circuit 28 (illustrated in phantom). In one embodiment, the housing assembly 24 includes a housing 234 that is generally rectangular box shaped and the housing 234 is made of a metallic material that provides an effective shield to electromagnetic radiation. This shielding can inhibit electromagnetic radiation generated by the modulator circuit 28 and the modulator element 26 from undesirably escaping the housing assembly 24, and also can inhibit strong external fields from adversely influencing the operation of the modulator circuit 28 and the modulator element 26. Alternatively, the housing 234 can be another shape or can be made of another material.

The size of resonant cavity is determined by the resonant frequency requirements of the beam modulator 14. If resonant frequency is low, a relatively large cavity is required. In one, non-exclusive example, the housing 234 has a height of approximately 1.5 inches, a width of approximately 1 inch and a length of approximately 2 inches. With this design, the beam modulator 14 is a relatively small in size. Alternatively, the housing 234 can be larger or smaller than these dimensions.

The modulator circuit 28 directs a voltage across the modulator element 26 to change and accurately adjust the index of refraction of the modulator element 26. In one embodiment, the modulator circuit 28 directs a fixed frequency sinusoidal voltage waveform of sufficient magnitude across the modulator element 26. The design of the modulator circuit 28 can be varied according to the teachings provided herein. For example, the modulator circuit 28 can include a circuit board 236 and a plurality of electrical components 238 that are secured or coupled to the circuit board 236. For example, one or more of the electrical components 238 can be one or more signal source(s), resistor(s), and/or inductor(s).

In alternative, non-exclusive embodiments, the modulator circuit 28 is a resonant tank circuit that is tunable to resonant frequencies from approximately (i) 200 to 380 MHz; (ii) 200-310 MHz, or (iii) 310-380 MHz. Stated another way, in alternative, non-exclusive embodiments, the modulator circuit 28 is a resonant tank circuit that is tunable to resonant frequencies of at least approximately 200, 225, 250, 275, 300, 325, 350, 375, or 380 MHz. However, the modulator circuit 28 can be designed to be tunable to frequencies that are greater or lesser than the amounts described above.

Figure 3:
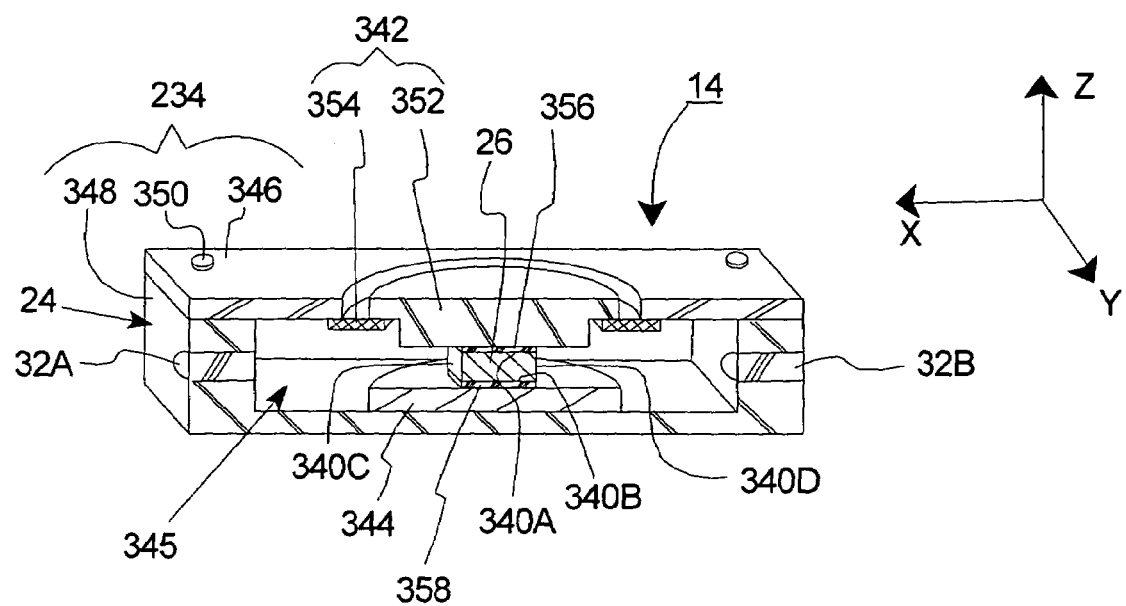
FIG. 3 is a perspective cut-away view taken on line 3-3 of FIG. 2.

FIG. 3 is a cut-away view of the beam modulator 14 of FIG. 2 including the modulator element 26, and the housing assembly 24. The size, shape, and design of these components can be varied to achieve the design requirements of the beam modulator 14.

In one embodiment, the modulator element 26 is made of a material having an index of refraction that changes when a voltage is applied across the modulator element 26. With this design, the voltage across the modulator element 26 changes the phase of the beam 20 (illustrated in FIG. 1) that passes through the modulator element 26. For example, the modulator element 26 can be made of a crystal material, such as lithium niabate or lithium tantalate. Other non-exclusive examples of materials for the modulator element 26 can include KTP, KD*P, RTP, RTA, BBO, LBO crystals, some glass materials, some semicondutors, and some polymers. The present invention is rather generic with respecting to type of material utilized for the modulator element 26.

In certain embodiments, the dimension of the modulator element 26 along the Z axis can be kept as small as possible, consistent with the size of the beam 20 (illustrated in FIG. 1), in order to minimize the level of voltage that needs to be applied to attain the desired beam modulation.

In one embodiment, the modulator element 26 is generally rectangular shaped and includes a top side 340A, a bottom side 340B that is opposite the top side 340A, a front side (not shown), a rear side (not shown) that is opposite the front side, a left side 340C, and a right side 340D that is opposite the left side 340C. It should be noted that one or more of these sides 340A-340D can be referred to herein as a first side or a second side. Alternatively, the modulator element 26 can have a different shape and/or configuration.

Further, one or both of the right side 340D and the left side 340C of the modulator element 26 can be coated with an anti-reflection coating.

The housing assembly 24 retains the modulator element 26 and in some embodiments encircles the modulator element 26. In one embodiment, the housing assembly 24 includes the housing 234, the optical windows 32A, 32B, a first retainer assembly 342, and a second retainer assembly 344. The size, shape and orientation of these components can be varied to achieve the design requirements of the beam modulator 14.

In the embodiment illustrated in FIG. 3, the housing 234 is generally rectangular box shaped and defines a generally rectangular shaped cavity 345 that receives and encircles the modulator element 26 and the modulator circuit 28 (illustrated in FIG. 2). Further, in this embodiment, the housing 234 includes a first housing component 346, a second housing component 348, and a fastener assembly 350.

In one embodiment, the second housing component 348 is generally open box shaped and the first housing component 346 is a generally plate shaped lid that fits over the top of the second housing component 348. In FIG. 3, the first housing component 346 includes an aperture for receiving a portion of the first housing component 346. Alternatively, for example, the shape of these housing components 346, 348 can be reversed or both of the housing components 346, 348 can be open box shaped.

The fastener assembly 350 secures the housing components 346, 348 together. In FIG. 3, the fastener assembly 350 includes a plurality of spaced apart fasteners that extend through the first housing component 346 and are threaded into the second housing component 348 to selectively secure the housing components 346, 348 together. Alternatively, for example, the fastener assembly 350 can include one or more threaded rods and corresponding nuts, an adhesive, and/or one or more latches.

In FIG. 3, the fastener assembly 350 urges the first housing component 346 against the second housing component 348. Moreover, in certain designs, the fastener assembly 350 urges the retainer assemblies 342, 344 together.

In one embodiment, the retainer assemblies 342, 344 cooperate to retain the modulator element 26 with the modulator element 26 between the retainer assemblies 342, 344. In certain embodiments, the retainer assemblies 342, 344 cooperate to apply a substantially uniform and precise pressure across the modulator element 26 without requiring extreme mechanical precision and without damaging the modulator element 26. For example, in alternative, non-exclusive embodiments, the retainer assemblies 342, 344 can cooperate to apply a pressure of between approximately 0 and 100 PSI, between approximately 20 and 80 PSI, between approximately 30 and 70 PSI, between approximately 40 and 60 PSI, or between approximately 10 and 100 PSI across the modulator element 26. Stated in another fashion, in alternative, non-exclusive embodiments, the retainer assemblies 342, 344 can cooperate to apply a pressure of approximately 5, 10, 20, 30, 40, 50, 60, 70, 80, 90, 100, 110, or 120 PSI across the modulator element 26.

It should be noted that in certain embodiments, with the present invention, the retainer assemblies 342, 344 can be used to precisely control (via design) the amount of pressure applied across the modulator element 26.

The design of the retainer assemblies 342, 344 can be varied to achieve the desired attachment characteristics of the modulator element 26. In one embodiment, the first retainer assembly 342 flexibly secures the modulator element 26 to the housing 234 and the second retainer assembly 344 fixedly secures the modulator element 26 to the housing 234 with the modulator element 26 positioned between the retainer assemblies 342, 344. Stated another way, in certain embodiments, the present invention provides both a relatively stiff conductive platform (e.g. the second retainer assembly 344) and an opposing compliant conductive platform (e.g. the first retainer assembly 342). With this design, the first platform is compliant with respect to the housing 234 and both platforms behave as rigid body when considered locally.

In FIG. 3, the first retainer assembly 342 is secured to the first housing component 346 and the second retainer assembly 344 is secured to the second housing component 348. Further, the first retainer assembly 342 is positioned adjacent to and attached to the top side 340A of the modulator element 26 and the second retainer assembly 344 is positioned adjacent to and attached to the bottom side 340B of the modulator element 26.

Alternatively, for example, the first retainer assembly 342 can be secured to the second housing component 348 and the second retainer assembly 344 can be secured to the first housing component 346.

In one embodiment, the first retainer assembly 342 includes a first mount 352 and a flexible attacher 354 that attaches the first mount 352 to the first housing component 346. In FIG. 3, the first mount 352 is generally disk shaped and defines a disk shaped platform that is adjacent to the modulator element 26. Alternatively, the first mount 352 can have another shape or configuration. The mounting platform can be made of an electrically conductive material. In one embodiment, the first mount 352 is electrically grounded and/or electrically connected to the modulator circuit 28 (illustrated in FIG. 2). Further, the first mount 352 is in electrical communication with the modulator element 26.

In one embodiment, the flexible attacher 354 is a relatively low stiffness flexural element. For example, in FIG. 3, the flexible attacher 354 is generally annular disk shaped and is made of an elastic material such as Ag filled silicone, Ag filled adhesives, Au plated thin film ribbons. The choice for interfacing materials should be low mechanical stiffness (flexible) and low electrical and thermal receptivity. In certain embodiments, the elastic material needs to behave in a manner that the stress-strain curve stays constant so that the clamping pressure will stay constant over time, temperature, and vibration. Good electrical and thermal contacts are required.

Alternatively, the flexible attacher 354 can have another design or shape or can be made of another type of flexible material. For example, the flexible attacher 354 can include one or more springs. With these designs, the flexible attacher 354 allows the first mount 352 to move relative to the first housing assembly 346. It should be noted that in certain embodiments, the amount of pressure across the modulator element 26 can be precisely controlled and programmed by adjusting thickness, or the stiffness of the flexible attacher 354. With this design, the amount of pressure applied across the modulator element 26 can be optimized to suit the dimensions and/or materials used in modulator element 26.

In one embodiment, the flexible attacher 354 is integrally formed with the first housing assembly 346.

In one embodiment, the second retainer assembly 344 is a disk shaped platform that is secured to the top of the bottom wall of the second housing component 348. Alternatively, the second retainer assembly 344 can have another shape or configuration. For example, the second retainer assembly 344 can be attached with an adhesive to the second housing assembly 348. Alternatively, the second retainer assembly 344 can be integrally formed with the second housing assembly 348.

In one embodiment, the second retainer assembly 344 is made of an electrically conductive material that is electrically connected to the modulator circuit 28 and the modulator element 26. With this design, the second retainer assembly 344 electrically connects the modulator circuit 28 to the modulator element 26.

With the present invention, in certain designs, the fastener assembly 350 urges the first housing components 346, 348 together and urges the retainer assemblies 342, 344 together with the modulator element 26 therebetween. As mentioned above, the flexible attacher 354 allows the first mount 352 to move relative to the first housing assembly 346. With this design, the retainer assemblies 342, 344 apply a uniform and small pressure across the modulator element 26. The flexible attacher 354 allows for the application of a small, controlled pressure on the modulator element 26 without extreme precision. In certain embodiments, the present invention maintains bonding integrity over large operating temperature range. The reliable bonding can be made with very different materials. This allows for freedom of choosing optimum materials for the components of the modulator 14.

Stated in another fashion, the flexible attacher 354 allows for some compliance between the first mount 352 and the first housing component 346. The fastener assembly 350 is designed such that when the first housing component 346 is secured to the second housing component 348, the compliant first mount 352 displaces a predetermined amount relative to the first housing component 346 thereby applying a predetermined and even pressure across the modulator element 26.

In certain designs, efficiency of modulator 14 is influenced by several factors including (i) the Q factor of the resonate cavity, and (ii) confinement of a large percentage of the stored electrical energy within the modulator element 26. The interface between the nonconductive E-O materials and conductive boundaries of resonant cavity plays a critical role in affecting both of these factors. In one embodiment, two facets of non-conductive EO materials need be in intimate contact with conductive boundaries of resonant cavity with both low thermal and electrical contact resistance.

In certain embodiments, the present invention includes a first layer 356 of solder, e.g. indium solder between the first mount 352 and the modulator element 26, and/or a second layer 358 of solder, e.g. indium solder between second retainer assembly 344 and the modulator element 26. However, the first layer 356 and/or the second layer 358 are not required.

While the particular apparatus 10 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A beam modulator for modulating a beam having a beam path, the beam modulator comprising:
   a modulator element that is positioned in the beam path;
   a modulator circuit that is electrical connected to the modulator element, the modulator circuit directing a voltage across the modulator element to change an index of refraction of the modulator element; and
   a housing assembly that retains the modulator element, the housing assembly including a housing and a first retainer assembly that flexibly secures the modulator element to the housing.

2. The beam modulator of claim 1 further comprising a second retainer assembly that fixedly secures the modulator element to the housing.

3. The beam modulator of claim 2 wherein the modulator element is positioned between the first retainer assembly and the second retainer assembly.

4. The beam modulator of claim 3 wherein the retainer assemblies cooperate to retain the modulator element in a fashion that applies a small pressure across the modulator element.

5. The beam modulator of claim 3 wherein the retainer assemblies cooperate to retain the modulator element in a fashion that applies a pressure of between approximately 10 and 100 PSI across the modulator element.

6. The beam modulator of claim 1 wherein the first retainer assembly includes a first mount that is secured to the modulator element and a flexible attacher that flexibly attaches the first mount to the housing.

7. The beam modulator of claim 6 wherein the flexible attacher includes an elastic member.

8. The beam modulator of claim 1 further comprising a fastener assembly that urges the retainer assemblies together.

9. A precision apparatus including a beam source that generates a beam and the beam modulator of claim 1 positioned in the path of the beam.

10. A beam modulator for modulating a beam having a beam path, the beam modulator comprising:
    a modulator element that is positioned in the beam path;
    a modulator circuit that is electrically connected to the modulator element, the modulator circuit directing a voltage across the modulator element to change an index of refraction of the modulator element; and
    a housing assembly that retains the modulator element, the housing assembly including a housing, a first retainer assembly that flexibly secures the modulator element to the housing, and a second retainer assembly that fixedly secures the modulator element to the housing, wherein the modulator element is positioned between the first retainer assembly and the second retainer assembly and the retainer assemblies cooperate to retain the modulator element in a fashion that applies a small pressure across the modulator element.

11. The beam modulator of claim 10 wherein the retainer assemblies cooperate to retain the modulator element in a fashion that applies a pressure of between approximately 10 and 100 across the modulator element.

12. The beam modulator of claim 10 wherein the first retainer assembly includes a first mount that is secured to the modulator element and a flexible attacher that flexible attaches the first mount to the housing.

13. The beam modulator of claim 10 further comprising a fastener assembly that urges the retainer assemblies together.

14. A precision apparatus including a beam source that generates a beam and the beam modulator of claim 10 positioned in the path of the beam.

15. A method for modulating a beam, the method comprising the steps of:
    positioning a modulator element in a beam path of the beam;
    directing a voltage across the modulator element to change an index of refraction of the modulator element;
    providing a housing; and
    flexibly securing the modulator element to the housing with a first retainer assembly.

16. The method of claim 15 further comprising the step of fixedly securing the modulator element to the housing with a second retainer assembly.

17. The method of claim 16 further comprising the step of positioning the modulator element between the first retainer assembly and the second retainer assembly and urging the retainer assemblies together so that the retainer assemblies cooperate to retain the modulator element in a fashion that applies a small pressure across the modulator element.

18. The beam modulator of claim 1 where the modulator element changes the phase of the beam that passes through the modulator element.

19. The beam modulator of claim 1 wherein the first retainer assembly is positioned substantially on one side of the beam path.

20. The beam modulator of claim 2 wherein the first retainer assembly is positioned substantially on a first side of the beam path and the second retainer assembly is positioned substantially on a second side of the beam path that is opposite to the first side.

21. The beam modulator of claim 4 wherein the pressure across the modulator element is applied in a direction transverse to the beam path.

* * * * *